(12) United States Patent
Jiang

(10) Patent No.: US 10,733,217 B2
(45) Date of Patent: Aug. 4, 2020

(54) METHOD AND APPARATUS FOR IDENTIFYING FALSE ADDRESS INFORMATION

(71) Applicant: Alibaba Group Holding Limited, George Town (KY)

(72) Inventor: Xianli Jiang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/440,895

(22) Filed: Jun. 13, 2019

(65) Prior Publication Data

US 2019/0294620 A1 Sep. 26, 2019

Related U.S. Application Data

(63) Continuation of application No. PCT/CN2017/114441, filed on Dec. 4, 2017.

(30) Foreign Application Priority Data

Dec. 14, 2016 (CN) .......................... 2016 1 1153869

(51) Int. Cl.
*G06F 16/00* (2019.01)
*G06F 16/29* (2019.01)
(Continued)

(52) U.S. Cl.
CPC .............. *G06F 16/29* (2019.01); *G06F 16/35* (2019.01); *G06Q 40/02* (2013.01); *H04L 67/306* (2013.01)

(58) Field of Classification Search
CPC ......... G06F 16/29; G06F 16/35; G06Q 40/02; H04L 67/306
See application file for complete search history.

(56) References Cited

U.S. PATENT DOCUMENTS 6,122,624 A * 9/2000 Tetro ..................... G06Q 20/04
705/44
6,728,767 B1 4/2004 Day et al.
(Continued)

FOREIGN PATENT DOCUMENTS

CN 104463668 3/2015
CN 105447129 3/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tamara T Kyle
*Assistant Examiner* — Lahcen Ennaji
(74) *Attorney, Agent, or Firm* — Fish & Richardson P.C.

(57) ABSTRACT

The present application discloses a method and an apparatus for identifying false address information. Address information submitted by a user for an account associated with the user is received. Geographical location information of the user is received within a predetermined time period. A residential range of the user is determined in a geographical range obtained through pre-division based on a trained classification model and the geographical location information of the user. The address information to be verified is matched with the residential range to generate a matching result. Based on the matching result and using information in the account associated with the user, a determination is made whether the address information to be verified is false address information.

18 Claims, 4 Drawing Sheets

(51) Int. Cl.
*G06Q 40/02* (2012.01)
*H04L 29/08* (2006.01)
*G06F 16/35* (2019.01)

(56) References Cited

U.S. PATENT DOCUMENTS

| | | | |
|---|---|---|---|
| 7,454,192 | B1 | 11/2008 | Zhu |
| 2008/0102819 | A1 | 5/2008 | Bengtsson et al. |
| 2009/0158404 | A1 | 6/2009 | Hahn et al. |
| 2013/0055370 | A1 | 2/2013 | Goldberg et al. |
| 2014/0324844 | A1* | 10/2014 | Hancock .............. G01C 21/20 707/724 |
| 2015/0095352 | A1* | 4/2015 | Lacey ................ G06Q 20/02 707/752 |
| 2015/0310434 | A1 | 10/2015 | Cheung |
| 2016/0132930 | A1 | 5/2016 | Handly et al. |
| 2017/0017921 | A1* | 1/2017 | Reeder .............. G06Q 10/0838 |

FOREIGN PATENT DOCUMENTS

| | | |
|---|---|---|
| CN | 105787104 | 7/2016 |
| CN | 106027544 | 10/2016 |
| CN | 107066478 | 8/2017 |
| GB | 2402841 | 12/2004 |

OTHER PUBLICATIONS

Nakamoto, "Bitcoin: A Peer-to-Peer Electronic Cash System," www.bitcoin.org, 2005, 9 pages.
PCT International Preliminary Report on Patentability in International Application No. PCT/CN2017/114441, dated Jun. 18, 2019, 10 pages (with English translation).
PCT International Search Report and Written Opinion in International Application No. PCT/CN2017/114441, dated Mar. 5, 2018, 15 pages (with English translation).
Brownlee [online], "Reproducible Machine Learning Results by Default," Jun. 2016, Machinelearningmastery.com, retrieved on Oct. 18, 2019, retrieved from URL<https://machinelearningmastery.com/reproducible-machine-learning-results-by-default/>, 9 pages.
Extended European Search Report in European Application No. 17880372.2, dated Oct. 18, 2019, 11 pages.
Sahr et al., "Geodesic Discrete Global Grid Systems," Cartography and Geographic Information Science, Jun. 2003, 30(2):121-134.
Ved [online], "How to improve performance of Neural Networks," d4datascience.wordpress.com, Sep. 2016, retrieved on Oct. 18, 2019, retrieved from URL<https://d4datascience.wordpress.com/2016/09/29/fbf/>, 8 pages.

* cited by examiner

METHOD AND APPARATUS FOR IDENTIFYING FALSE ADDRESS INFORMATION

CROSS-REFERENCE TO RELATED APPLICATIONS

This application is a continuation of PCT Application No. PCT/CN2017/114441, filed on Dec. 4, 2017, which claims priority to Chinese Patent Application No. 201611153869.5, filed on Dec. 14, 2016, and each application is hereby incorporated by reference in its entirety.

TECHNICAL FIELD

The present application relates to the field of information technologies, and in particular, to a method and an apparatus for identifying false address information.

BACKGROUND

As information technologies develop, more services are performed through a network. Usually, authenticity of address information provided by a user can be verified to ensure service execution security. For example, during verification of basic information of an account, if address information of the account is false, the account is risky, and a service needs to be performed prudently.

In the existing technology, the address information is usually verified by using a search engine or logistics information.

Verifying the address information by using a search engine is to enter address information to be verified to an existing search engine for searching, and determine whether the address information to be verified exists by using address information recorded in the search engine. Verifying the address information by using the logistics information is to verify the authenticity of the address information to be verified by using existing address information in the recorded logistics information.

However, during verification of the address information by using a search engine, both accuracy and coverage of a verification result are determined based on an amount of address information that has been recorded by a selected search engine. In other words, when a large amount of address information is recorded by the selected search engine and the address information covers a wide geographical range, the accuracy and the coverage of the verification result may be relatively high. However, the search engine usually accurately records address information in a prosperous region, but inaccurately records address information in a remote region. Consequently, the accuracy of verifying the address information based on the search engine is unstable and low.

In the method for verifying the address information by using the logistics information, it is difficult to obtain the logistics information because the logistics information is usually strictly protected in the logistics industry to ensure privacy of a user who uses a logistics service. In addition, accuracy and authenticity of the logistics information do not always need to be verified, for example, a user name "Sun Wukong" or an address "East gate of a certain community in a certain district of a certain city". Although the described logistics information is untrue and inaccurate, the logistics service is not affected. However, the logistics information cannot be used to verify the address information to be verified. Consequently, it is difficult to ensure the accuracy and the coverage of verifying the address information to be verified by using the logistics information.

Further, although the user provides real address information, it is difficult to determine whether the address is a working address or a living address of the user. In other words, the address information is real, but is not an address of the user. For example, user a uses home address c of user b as his home address, and home address c of user b really exists. Therefore, in the existing technology, only home address c can be identified to be real, but whether home address c belongs to user a cannot be determined. For user a, home address c is false address information. However, it is still difficult to identify such false address information in the existing technology, and consequently accuracy of risk control based on the address information is reduced.

It can be seen that, because of the described disadvantages in the existing technology, accuracy of identifying false address information is low.

SUMMARY

Implementations of the present application provide a method for identifying false address information, to alleviate a problem in the existing technology that accuracy of verifying false address information is low because accuracy of verifying address information is low and it is difficult to verify a mapping relationship between an address and an account.

The implementations of the present application provide an apparatus for identifying false address information, to alleviate the problem in the existing technology that accuracy of verifying false address information is low because accuracy of verifying address information is low and it is difficult to verify a mapping relationship between an address and an account.

The implementations of the present application use the following technical solutions.

A method for identifying false address information includes the following: determining address information of an account to be verified; determining, in a geographical range obtained through pre-division, a residential range of the account based on a trained classification model and geographical location information that is reported by the account within a predetermined time period; matching the address information to be verified with the residential range; and determining, based on a result of matching between the address information to be verified and the residential range, whether the address information to be verified is false address information.

An apparatus for identifying false address information includes the following: a first determining module, configured to determine address information of an account to be verified; a second determining module, configured to determine, in a geographical range obtained through pre-division, a residential range of the account based on a trained classification model and geographical location information that is reported by the account within a predetermined time period; a matching module, configured to match the address information to be verified with the residential range; and an identification module, configured to determine, based on a result of matching between the address information to be verified and the residential range, whether the address information to be verified is false address information.

The at least one technical solution used in the implementations of the present application can achieve the following beneficial effects.

Firstly, the address information of the account to be verified is determined; secondly, in the geographical range obtained through pre-division, the residential range of the account is determined by using the trained classification model based on the geographical location information reported by the account within the predetermined time period; thirdly, whether the address information to be verified is false address information is determined based on a result of matching between the address information to be verified and a grid corresponding to the residential range. It can be seen that, in the present application, a residential range of a user who uses the account is determined by using a classification model and geographical location information that is historically reported by the account. Because the geographical location information reported by the account is real and corresponds to the account, the determined residential range is real and belongs to the account. As such, accuracy of identifying false address information can be higher by matching the address information to be verified with the residential range.

BRIEF DESCRIPTION OF DRAWINGS

The accompanying drawings described here are used to provide further understanding of the present application, and constitute a part of the present application. Schematic implementations of the present application and descriptions of the implementations are used to explain the present application, and do not constitute an improper limitation to the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and corresponding accompanying drawings in the present application. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
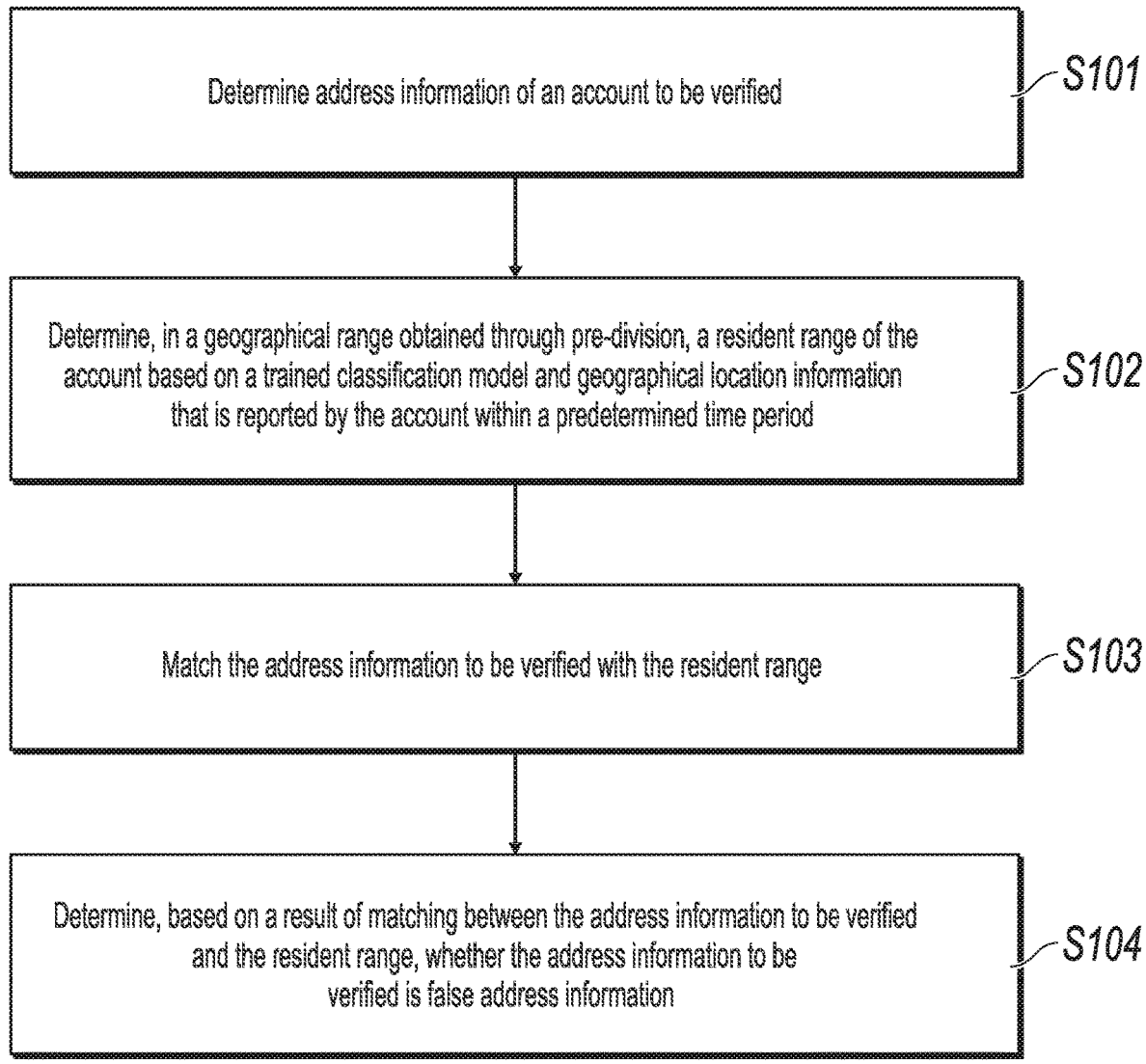
FIG. 1 illustrates a process of identifying false address information, according to an implementation of the present application.

FIG. 1 illustrates a process of identifying false address information, according to an implementation of the present application. The process includes the following steps.

S101. Determine address information of an account to be verified.

In the existing technology, a server of a service provider usually verifies address information because the service provider needs to verify the address information. Alternatively, the service provider can entrust a third party to verify the address information. Address information verification can be performed by the server based on a predetermined condition (for example, address information verification is performed periodically or at a predetermined frequency), or can be initiated by the third party (for example, a third party server proposes an address information verification request). How to start address information verification is not limited in the present application.

In addition, because a user usually provides the address information for the server by using the account, the address information usually corresponds to the account. As such, in the present implementation of the present application, the server can first determine the address information of the account to be verified.

The address information to be verified can be a residential address of the user that is set in the account, such as a home address or a working address. As such, when determining that risk control needs to be performed on the account, the server can invoke all address information that is set in the account and use the address information as the address information of the account to be verified.

Alternatively, the address information to be verified can be address information returned by the account after the server sends address query information to the account, where the address query information can include at least one of text information, audio information, and video information. For example, the text information can be "Please provide a detailed home address" or "Please provide a detailed working address", so that the account returns the address information to be verified to the server. As such, the server can first determine an account that needs to undergo risk control, then send the address query information to the account, and receive address information returned by the account and use the address information as the address information of the account to be verified.

Certainly, how the server determines the address information of the account to be verified is not limited in the present application, and can be set by the staff as needed. In addition, that the server determines whether the address information of the account to be verified is the home address or the working address of the account can be set by the staff as needed, or the address information to be verified can include both the home address and the working address of the account.

It is worthwhile to note that, in the present implementation of the present application, the server can be one device, or can be a system including a plurality of devices, namely, a distributed server.

S102. Determine, in a geographical range obtained through pre-division, a residential range of the account based on a trained classification model and geographical location information that is reported by the account within a predetermined time period.

A life track of people is relatively fixed and regular in modern society. For example, people work in an office or study at school in the daytime and rest at home at night. On holidays instead of workdays, people can travel around for relax in addition to staying at home, which is relatively random. However, because the life track of people is relatively fixed and regular, a living area and a working area of the user can be accurately determined by determining location information of the user in different time periods.

Therefore, in the present implementation of the present application, after determining the address information of the account to be verified, the server can further determine the residential range of the account as a residential range of a user who uses the account, to subsequently verify the address information to be verified and identify false address information.

Because a life track of the user who uses the account (referred to as a life track of the account below) needs to be determined to determine the residential range of the user who uses the account, the server can first determine the geographical location information reported by the account. After the account logs in, geographical location information that is sent to the server and that is of a device that the account is currently logging in to is reported at a predetermined time frequency (for example, 30 minutes); or when the account is logging in, geographical location information that is sent to the server and that is of a device that the account is currently logging in to is reported. A method for reporting the geographical location information by the account can be set as needed, or the geographical location information reported by the account can be determined by obtaining a user address book in real time in the existing technology, which is not limited in the present application. Because a longer time that the account stays at the same location indicates more geographical location information reported by the account at the location, the residential range of the user who uses the account can be determined by using the reported geographical location information, namely, the residential range of the account.

In addition, the geographical location information reported by the account can be a part of or all of geographical location information reported by the account, which can be set as needed.

Further, working places and living places of people are usually fixed in a short time period, and mobility of people is relatively high in modern society. Therefore, in the present application, the server can determine the geographical location information reported by the account within the predetermined time period. The predetermined time period can be a time period dating back from a current moment. For example, assume that the current moment is Nov. 11, 2016, and the predetermined time period is four months dating back from the current moment. The server can determine geographical location information reported by the account from Jul. 11, 2016 to Nov. 11, 2016. Alternatively, the predetermined time period can be a time period from a specified start time to a specified end time, for example, a time period from January 1 to June 1. The predetermined time period can be set by the staff as needed, and is not limited in the present application.

Further, the predetermined time period can be set by the staff as needed, for example, four months or nine months. However, because a house is usually rented for at least half a year, if the predetermined time period exceeds six months, the possibility that the life track of the account changes is improved. Certainly, the predetermined time period is not limited in the present application, and can be set by the staff as needed. As such, a relatively regular life track of the account can be determined by determining the geographical location information reported by the account within the predetermined time period, and the following cases are prevented: A plurality of life tracks are determined because geographical location information in a very long time period is collected, and it is difficult to determine a life track of the account because geographical location information in a very short time period is collected.

In addition, in the present application, because positioning accuracy of the device is not fixed, an error can occur in positioning accuracy of the geographical location information when the device is affected by an environment, and consequently the geographical location information reported by the account has different positioning accuracy. Therefore, to more accurately determine the residential range of the user who uses the account, the server can further divide a map into several grids based on a predetermined grid size; use each grid on the map as the geographical range obtained through pre-division; replace geographical location information having accurate positioning with each geographical range; and determine the residential range of the user who uses the account, thereby preventing increased positioning accuracy redundancy of the geographical location information due to impact caused by a positioning accuracy error. The grids obtained by dividing the map are shown in FIG. 2.

Figure 2:
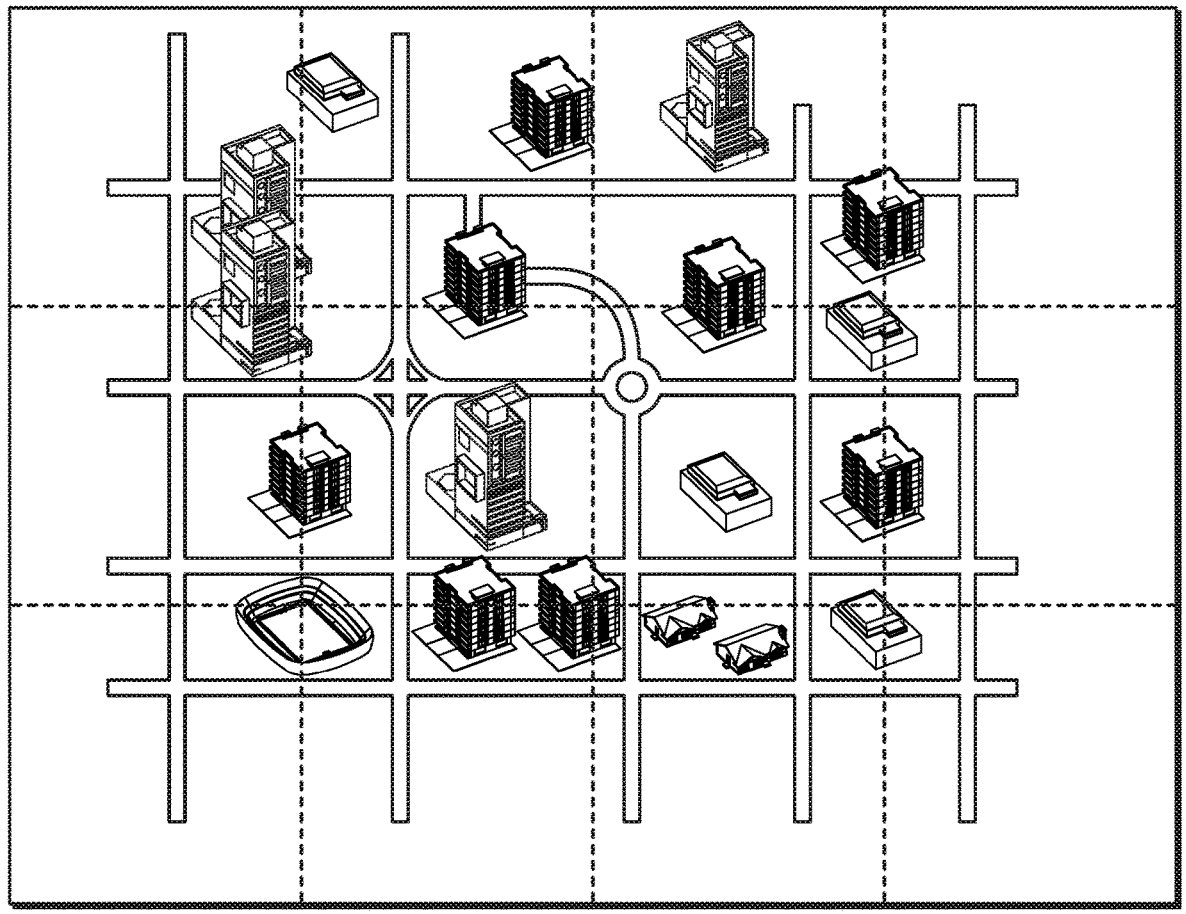
FIG. 2 is a schematic diagram illustrating a map grid, according to an implementation of the present application.

FIG. 2 is a schematic diagram illustrating a map grid, according to an implementation of the present application. It can be seen that a map stored in the server has been pre-divided into grids. Each grid is a dashed-line square and can be represented by using a longitude and a latitude. In addition, a side length of the grid can be set by the staff as needed. For example, the side length of the square grid is 500 meters. It is worthwhile to note that a shorter side length of the grid obtained through pre-division indicates higher accuracy of determining the residential range of the user who uses the account, but also means a higher requirement on accuracy of the geographical location information reported by the account, and larger impact caused by the positioning accuracy error. Certainly, the grid can be of another shape, such as a circle or a triangle, which is not limited in the present application.

Then, the server can determine, based on each grid obtained through pre-division, a quantity of times and a moment that the geographical location information reported by the account within the predetermined time period appears in each grid, and determine a characteristic value of the account in each grid. The characteristic values are shown in Table 1.

TABLE 1

| Characteristic Value Identifier | Characteristic Value Description |
| --- | --- |
| Proportion of a quantity of times of appearing | A ratio of a quantity of times that the training sample appears in the grid to a total quantity of times that the training sample appears |
| Proportion of a quantity of days of appearing | A ratio of a quantity of days on which the training sample appears in the grid to a total quantity of days on which the training sample appears |
| Proportion of a quantity of workdays | A ratio of a quantity of workdays on which the training sample appears in the grid to the total quantity of days on which the training sample appears |

TABLE 1-continued

| Characteristic Value Identifier | Characteristic Value Description |
|---|---|
| Proportion of a quantity of holidays | A ratio of a quantity of holidays on which the training sample appears in the grid to the total quantity of days on which the training sample appears |
| Proportion of a quantity of workdays of appearing in the daytime | A ratio of a quantity of workdays on which the training sample appears in the grid in the daytime to the total quantity of days on which the training sample appears |
| Proportion of a quantity of workdays of appearing at night | A ratio of a quantity of workdays on which the training sample appears in the grid at night to the total quantity of days on which the training sample appears |
| Proportion of a quantity of holidays of appearing in the daytime | A ratio of a quantity of holidays on which the training sample appears in the grid in the daytime to the total quantity of days on which the training sample appears |
| Proportion of a quantity of holidays of appearing at night | A ratio of a quantity of holidays on which the training sample appears in the grid at night to the total quantity of days on which the training sample appears |

It can be seen from Table 1 that an appearance frequency of the account, an appearance time period of the account, etc. in the grids can be determined by using the described eight characteristic values. For example, for each grid, whether the grid is a grid where the account frequently appears can be determined by using the proportion of the quantity of times of appearing and the proportion of the quantity of days of appearing. Apparently, if the grid is not a grid where the account frequently appears, the possibility that the grid is the residential range of the user who uses the account is relatively low. Whether the grid is the residential range of the user who uses the account can be determined by using the proportion of the quantity of workdays. Apparently, because a travel track of people on workdays is usually fixed, a grid where people appears most frequently on workdays is more likely to be the residential range of the user who uses the account. Whether the grid is a working place or a living place of the account can be determined by using the proportion of the quantity of holidays (for example, if the user frequently goes to a certain gymnasium on the weekend, the training sample appears a relatively large quantity of times in a grid corresponding to the gymnasium on holidays. However, the grid is not the working place or the living place of the user). Whether the grid is a working place of the account can be determined by using the proportion of a quantity of workdays of appearing in the daytime, and whether the grid is a living place of the account can be determined by using the proportion of a quantity of workdays of appearing at night. In other words, the characteristic value determined in each grid can reflect a life track and a pattern of living of the account in the grid obtained by dividing the map. In addition, interference imposed by a low-frequency area of the account (namely, a geographical range where the account less appears) on the determined residential range of the user who uses the account can be eliminated to more accurately determine the grid corresponding to the residential range of the user who uses the account. In addition, grids corresponding to the living place and the working place of the account can be determined.

In addition, the geographical location information reported by the account can usually include a report time. Therefore, in the present application, the server can determine some characteristic values in Table 1 by using the report time of the geographical location information. The report time can be a system time of the server when the server receives the geographical location information, or can be time information when the geographical location information is determined, or can be a sending time of the device when the device sends the geographical location information to the server. If the system time of the server is used, it can be determined that time of reporting geographical location information of accounts is relatively unified for management. However, an error caused by a network information delay may occur. Certainly, which report time is used is not limited in the present application, and can be set by the staff as needed.

Finally, the server can further determine, from all grids based on the trained classification model, a grid where the user who uses the account frequently appears as the residential range of the user who uses the account. In other words, the server can input a characteristic value corresponding to the account in each grid into the trained classification model, and determine, from all the grids based on a classification result of each grid that is output by the classification model, a grid that belongs to the residential range of the user who uses the account.

It is worthwhile to note that the server can select the described one or more characteristic values to determine the residential range of the user who uses the account. In the present application, it is not limited that the server needs to use all characteristic values to determine the residential range of the user who uses the account. In addition, it is not limited that only eight characteristic values shown in Table 1 can be used to determine the residential range of the user who uses the account. The characteristic value can be determined by the staff as needed.

The classification model can be trained as follows:

The server can first predetermine, as a training sample, an account having a plurality of pieces of geographical location information verified to be real, namely, an account having real known address information; then collect geographical location information reported by all training samples; and determine a characteristic value of each training sample in each grid, in other words, determine the characteristic value of each training sample in each grid based on a quantity of times and a moment that the training sample appears in each grid.

Then, the server can successively input characteristic values corresponding to all the training samples into the classification model, and obtain the classification result. Initial parameters of the classification model can be generated randomly or set by the staff. The classification result is as follows: For each training sample, the classification model determines whether each grid belongs to a grid corresponding to a residential range or a grid corresponding to a non-residential range.

In addition, the server can determine accuracy of the classification result of the classification model based on locations of coordinates respectively corresponding to real known address information of all the training samples in the grids, and adjust parameters in the classification model based on the accuracy.

The described process can be repeated until a predetermined quantity of repetition times is reached, or until the accuracy of the classification result of the classification model reaches a predetermined threshold. The predetermined threshold can be set by the staff as needed.

Further, in the present application, the classification model can include a random forest classification algorithm, a logistic regression classification algorithm, a neural network classification algorithm, etc. The present application imposes no limitation on a specific classification model to be used.

S103. Match the address information to be verified with the residential range.

S104. Determine, based on a result of matching between the address information to be verified and the residential range, whether the address information to be verified is false address information.

In the present implementation of the present application, after using the trained classification model to determine a grid among the grids that corresponds to the residential range of the user who uses the account, the server can match the address information to be verified with the residential range, and determine whether the address information to be verified is false address information.

The server can first determine coordinates of the address information to be verified according to a longitude and a latitude corresponding to the address information to be verified; then determine a grid corresponding to the coordinates of the address information to be verified in the grids; finally determine whether the grid corresponding to the address information to be verified is the same as the grid corresponding to the residential range of the user who uses the account (in other words, determine whether the coordinates of the address information to be verified fall within the grid corresponding to the residential range); in response to determining that the grid corresponding to the address information to be verified is the same as the grid corresponding to the residential range of the user who uses the account, determine that the address information to be verified is not false address information; and in response to determining that the grid corresponding to the address information to be verified is different from the grid corresponding to the residential range of the user who uses the account, determine that the address information to be verified is false address information.

If the grid corresponding to the address information to be verified matches the grid corresponding to the residential range of the user who uses the account, it indicates that the coordinates of the address information to be verified are in the grid corresponding to the residential range of the user who uses the account.

According to the risk control method shown in FIG. 1, the server can determine the grid corresponding to the residential range of the user who uses the account; then match the grid corresponding to the address information of the account to be verified with the grid corresponding to the residential range of the user who uses the account; and determine, based on a matching result, whether the address information to be verified is false address information. It can be seen that, during verification of the address of the account to be verified, the server determines, based on geographical location information historically reported by the account, the residential range of the user who uses the account in the map grid obtained through pre-division, so that reliability of the grid corresponding to the residential range is relatively high; in addition, it can be determined that the grid corresponding to the residential range belongs to the account. Therefore, when matching is performed between the grid corresponding to the residential range and the address information to be verified, accuracy of the matching result is relatively high. As a result, a relatively accurate identification result of the false address information is obtained, thereby improving accuracy of identifying false address information.

In addition, different devices may have different positioning accuracy, and positioning accuracy of the same device may vary in different external conditions. If the geographical location information reported by the account includes geographical location information with relatively low positioning accuracy, a subsequently determined grid corresponding to the residential range of the user who uses the account may be inaccurate, and consequently the accuracy of identifying false address information is affected.

Therefore, in the present implementation of the present application, when determining the geographical location information reported by the account within the predetermined time period, the server can further select, from the geographical location information based on a predetermined positioning accuracy threshold, geographical location information whose positioning accuracy is not less than the positioning accuracy threshold; use the geographical location information as the address information of the account to be verified for inputting into the trained classification model; and determine the grid corresponding to the residential range of the user who uses the account.

Likewise, the server can determine, for each training sample from the geographical location information reported within the predetermined time period, the geographical location information whose positioning accuracy is not less than the positioning accuracy threshold, and train the classification model.

Further, in the present application, different classification models exert different effects on different types of data, and geographical location information of training samples is usually randomly distributed. For example, a working place and a living place of a training sample are close to each other, or a working place and a living place of a training sample are far away from each other. Consequently, accuracy of classification results obtained by using different classification models is different for the same training sample. Therefore, in the present implementation of the present application, when training the classification model, the server can select, by using a common method, a classification model with a better effect from a plurality of classification models as a classification model for determining the grid corresponding to the residential range. The server can separately train the training sample by using the plurality of classification models; calculate an area under a receiver operating characteristic curve (ROC curve) (Area Under Curve, AUC) corresponding to each classification model; and use a classification model with a maximum AUC as the trained classification model. Certainly, a specific classification model can also be selected by the staff as needed. For example, a classification model with a relatively high classification speed is selected as the trained classification model based on time costs. The present application imposes no specific limitation.

Further, as described above, classification models trained by using different types of data can be different. Therefore, in the present implementation of the present application, to improve applicability of a classification model, the server can select a training sample of a predetermined proportion to test each classification model. As such, a sample used by the server to train each classification model can be different from a sample used to calculate an AUC, to achieve a better classification model selection effect. The predetermined proportion can be set by the staff. The present application imposes no limitation.

In addition, because a life track of the training sample is not completely fixed, when the classification model is trained by using each training sample, the server can determine geographical location information reported by each training sample within a time period. The time period can be consistent with or inconsistent with the predetermined time period. A start moment and an end moment of the time period can be determined by the staff as needed, for example, geographical location information reported by the training sample within four months dating back from a moment of determining that the address information of the training sample is real. The present application imposes no specific limitation.

Further, the characteristic values shown in Table 1 reflect a life track and a pattern of living of the account. In addition, it can be determined, in classification results determined by the classification model by using the report time of the geographical location information and by using the characteristic value, that the residential range of the user who uses the account can further include a resident living range of the user who uses the account and a resident working range of the user who uses the account.

In step S101, the address information of the account to be verified that is determined by the server can further include living address information to be verified and working address information to be verified. Therefore, the trained classification model can be used to determine a resident living range and a resident working range corresponding to the account by using the geographical location information reported by the account.

Further, when determining each training sample, the classification model can determine several accounts with real known living address information and working address information as training samples; determine, based on several pieces of geographical location information reported by each training sample, a quantity of times and a moment that the training sample appears in each grid; then determine, based on the quantity of times and the time that the training sample appears in the grid, a characteristic value corresponding to the training sample in each grid; and finally train the classification model based on the characteristic value corresponding to the training sample in each grid, the real known living address information of each training sample, and the real known working address information of each training sample. Therefore, the classification model can determine the residential range as the resident living range and the resident working range only when determining the residential range.

In addition, in step S103, when the address information to be verified is the living address information to be verified, coordinates of the living address information to be verified are determined based on a longitude and a latitude corresponding to the living address information to be verified; it is determined whether the coordinates of the living address information to be verified fall within the resident living range; in response to determining that the coordinates of the living address information to be verified fall within the resident living range, it is determined that the address information to be verified is not false address information; and in response to determining that the coordinates of the living address information to be verified fall within the resident living range, it is determined that the address information to be verified is false address information. When the address information to be verified is the working address information to be verified, coordinates of the working address information to be verified are determined based on a longitude and a latitude corresponding to the working address information to be verified; it is determined whether the coordinates of the working address information to be verified fall within the resident working range; in response to determining that the coordinates of the working address information to be verified fall within the resident working range, it is determined that the address information to be verified is not false address information; and in response to determining that the coordinates of the working address information to be verified fall within the resident working range, it is determined that the address information to be verified is false address information.

Usually, when a financial institution determines a risk of applying for a loan or a credit card by the account, the account needs to provide information such as identity information, contact information, and asset information, and verify the information to determine a potential risk of the account for subsequent operations. The contact information can include a phone number, address information, etc.

Therefore, in another implementation of the present application, verifying the address information may indicate that the financial institution verifies the address information of the account when the account applies for the credit card or a credit service from the financial institution. As such, the server can be a server used by the financial institution to verify the address information, or the financial institution can be a third party that initiates an address information verification request to the server. The financial institution usually verifies authenticity of the address information and whether the address information belongs to the account.

Further, after step S101 to step S104, the server can determine whether the address information of the account to be verified is false address information. In addition, the server can not only determine authenticity of the address information to be verified, but also determine whether the address information to be verified corresponds to the account, in other words, whether the address information to be verified matches the residential range of the user who uses the account.

Further, because the address information to be verified can be the living address information to be verified and/or the working address information of the account to be verified, a risk of the account can be determined by determining whether the address information to be verified is false address information. For example, if the account provides false address information, the possibility of defrauding loans by the account is relatively high, and vice versa. For example, assume that user d applies for a credit card service from bank f by using account e, and provides living address g and working address h as needed by the bank; and assume that server i of bank f determines that address information of account e to be verified includes a living address to be verified, namely, living address g, and a working address to be verified, namely, living address h. Server i can first separately determine, based on a trained classification model and geographical location information that is reported by account e within a predetermined time period, a resident living range and a resident working range of account e in a geographical range obtained through pre-division; then separately match living address information to be verified with the resident living range, and working address information to be verified with the resident working range; and finally determine, based on a result of matching between the living address information to be verified and the resident living range and a result of matching between the working address information to be verified with the resident working range, whether the living address information to be verified and the working address to be verified are false address information. When either of the living address information to be verified and the working address to be verified is false address information, server i can determine that a risk of account e is relatively high, and does not provide account e with the credit card service, or reduce a line of credit provided by account e. Certainly, after it is determined that the account provides false address information, an operation to be performed subsequently is not limited in the present application.

It is worthwhile to note that all the steps of the method provided in the implementations of the present application can be performed by the same device, or can be performed by different devices. For example, step S101 and step S102 can be performed by device 1, and step S103 can be performed by device 2. For another example, step S101 can be performed by device 1, and step S102 and step S103 can be performed by device 2. In other words, the server can be a distributed server including a plurality of devices. In addition, each step of the method provided in the implementations of the present application can be performed by a server or an end-user device, which is not limited. The end-user device can be a device such as a mobile phone, a personal computer, or a tablet computer.

Figure 3:
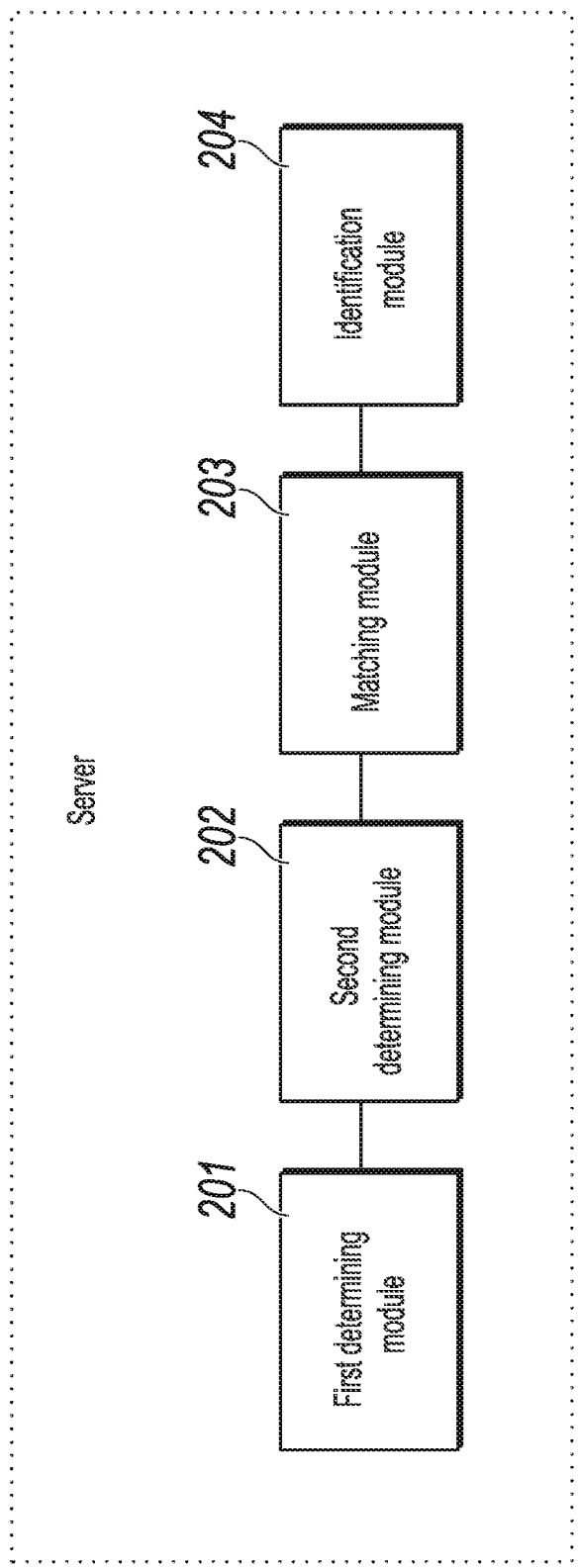
FIG. 3 is a schematic structural diagram illustrating an apparatus for identifying false address information, according to an implementation of the present application.

As shown in FIG. 3, based on the process of identifying false address information shown in FIG. 1, an implementation of the present application further correspondingly provides an apparatus for identifying false address information.

FIG. 3 is a schematic structural diagram illustrating an apparatus for identifying false address information, according to an implementation of the present application. The apparatus includes the following: a first determining module 201, configured to determine address information of an account to be verified; a second determining module 202, configured to determine, in a geographical range obtained through pre-division, a residential range of the account based on a trained classification model and geographical location information that is reported by the account within a predetermined time period; a matching module 203, configured to match the address information to be verified with the residential range; and an identification module 204, configured to determine, based on a result of matching between the address information to be verified and the residential range, whether the address information to be verified is false address information.

The geographical location information includes a longitude and a latitude.

The geographical location information further includes positioning accuracy. The second determining module 202 determines, based on a predetermined positioning accuracy threshold, geographical location information whose positioning accuracy is not less than the predetermined positioning accuracy threshold from the geographical location information reported by the account within the predetermined time period; and determines, in the geographical range obtained through pre-division, the residential range of the account based on the trained classification model and the geographical location information whose positioning accuracy is not less than the predetermined positioning accuracy threshold.

The second determining module divides a map into several grids based on a predetermined grid size, and uses each grid on the map as the geographical range obtained through pre-division.

The second determining module 202 trains the classification model by using the following method: determining several accounts with real known address information as training samples; determining, based on several pieces of geographical location information reported by each training sample, a quantity of times and a moment that the training sample appears in each grid; determining a characteristic value corresponding to the training sample in each grid based on the quantity of times and the moment that the training sample appears in each grid; and training the classification model based on the characteristic value corresponding to the training sample in each grid and real known address information of the training sample.

The second determining module 202 determines a characteristic value corresponding to the account in each grid based on the geographical location information reported by the account within the predetermined time period; and inputs the characteristic value corresponding to the account in each grid into the trained classification model to determine the residential range of the account.

The identification module 204 determines coordinates of the address information to be verified based on a longitude and a latitude corresponding to the address information to be verified; determines whether the coordinates of the address information to be verified fall within the residential range; in response to determining that the coordinates of the address information to be verified fall within the residential range, determines that the address information to be verified is not false address information; and in response to determining that the coordinates of the address information to be verified do not fall within the residential range, determines that the address information to be verified is false address information.

The address information to be verified includes living address information to be verified and working address information to be verified. The second determining module 202 determines, in the geographical range obtained through pre-division, a resident living range and a resident working range of the account based on the trained classification model and the geographical location information that is reported by the account within the predetermined time period.

The second determining module 202 determines several accounts with real known living address information and working address information as training samples; determines, based on several pieces of geographical location information reported by each training sample, a quantity of times and a moment that the training sample appears in each grid; determines a characteristic value corresponding to the training sample in each grid based on the quantity of times and the moment that the training sample appears in each grid; and trains the classification model based on the characteristic value corresponding to the training sample in each grid, real known living address information of the training sample, and real known working address information of the training sample, so that the classification model is used to determine the resident living range and the resident working range.

The characteristic value corresponding to the training sample in any grid includes at least one of a ratio of a quantity of times that the training sample appears in the grid to a total quantity of times that the training sample appears, a ratio of a quantity of days on which the training sample appears in the grid to a total quantity of days on which the training sample appears, a ratio of a quantity of workdays on which the training sample appears in the grid to the total quantity of days on which the training sample appears, a ratio of a quantity of holidays on which the training sample appears in the grid to the total quantity of days on which the training sample appears, a ratio of a quantity of workdays on which the training sample appears in the grid in the daytime to the total quantity of days on which the training sample appears, a ratio of a quantity of workdays on which the training sample appears in the grid at night to the total quantity of days on which the training sample appears, a ratio of a quantity of holidays on which the training sample appears in the grid in the daytime to the total quantity of days on which the training sample appears, and a ratio of a quantity of holidays on which the training sample appears in the grid at night to the total quantity of days on which the training sample appears.

When the address information to be verified is the living address information to be verified, the identification module 204 determines coordinates of the living address information to be verified based on a longitude and a latitude corresponding to the living address information to be verified; determines whether the coordinates of the living address information to be verified fall within the resident living range; in response to determining that the coordinates of the living address information to be verified fall within the resident living range, determines that the address information to be verified is not false address information; and in response to determining that the coordinates of the living address information to be verified do not fall within the resident living range, determines that the address information to be verified is false address information. When the address information to be verified is the working address information to be verified, the identification module 204 determines coordinates of the working address information to be verified based on a longitude and a latitude corresponding to the working address information to be verified; determines whether the coordinates of the working address information to be verified fall within the resident working range; in response to determining that the coordinates of the working address information to be verified fall within the resident working range, determines that the address information to be verified is not false address information; and in response to determining that the coordinates of the working address information to be verified do not fall within the resident working range, determines that the address information to be verified is false address information.

The described apparatus for identifying false address information shown in FIG. 3 can be located in a server. The server can be one device, or can be a system including a plurality of devices, namely, a distributed server.

In the 1990s, whether technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, references can be made to the implementations. Each implementation focuses on a difference from other implementations. Particularly, a system implementation is basically similar to a method implementation, and therefore is described briefly. For related parts, references can be made to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

Figure 4:
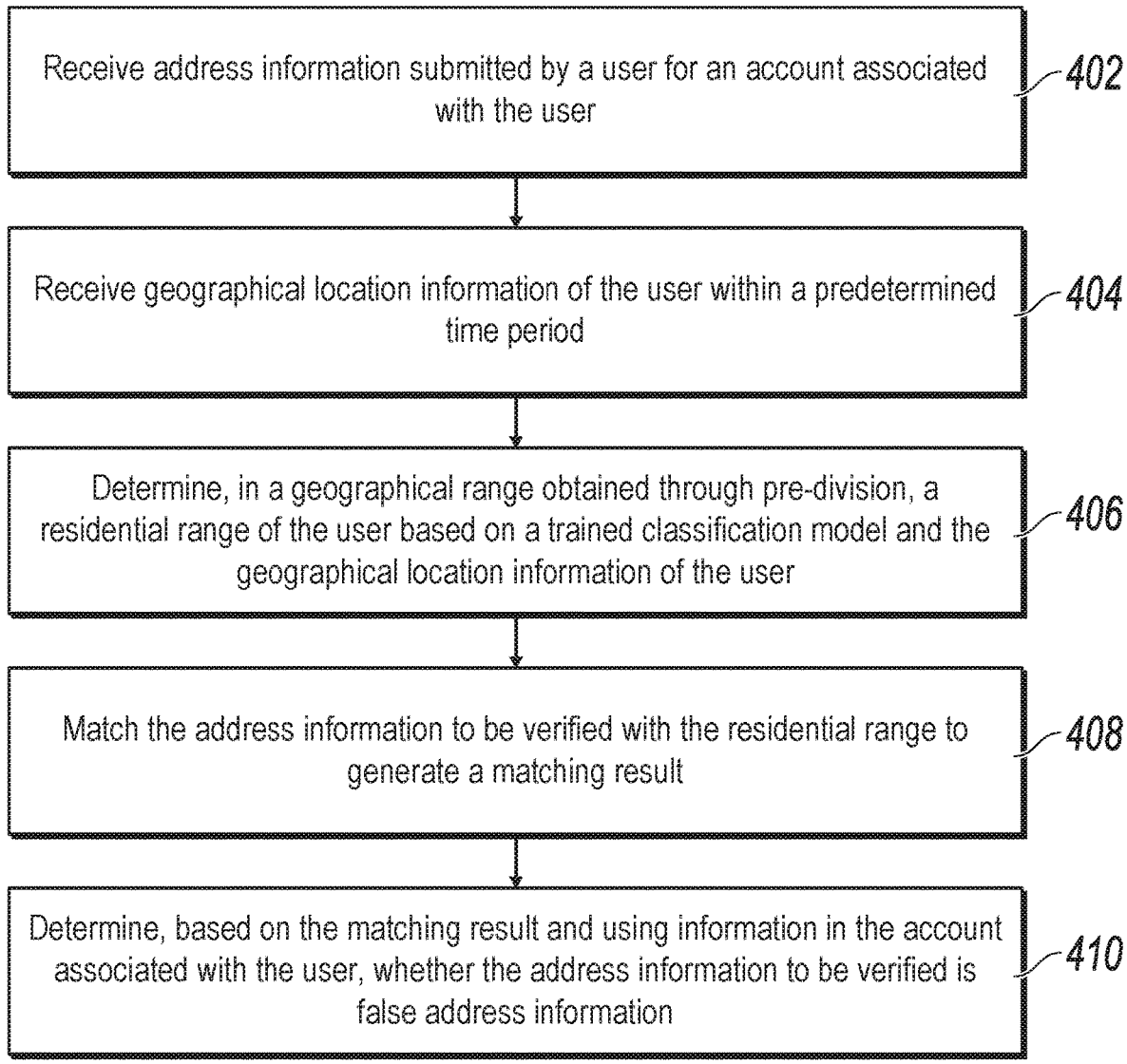
FIG. 4 is a flowchart illustrating an example of a computer-implemented method for identifying false address information, according to an implementation of the present disclosure.

FIG. 4 is a flowchart illustrating an example of a computer-implemented method 400 for identifying false address information, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, address information submitted by a user for an account associated with the user is received. For example, address query information submitted by the user can be transmitted to an account for address information to be verified. As an example, a server of a service provider can send a request to verify a user's address information as part of a service provider's address information verification. Address information verification can be performed periodically or at a predetermined frequency, for example. The address query information can be in the form, for example, of text information, audio information, or video information.

In some implementations, the address information to be verified can comprise living (home) address information to be verified and working (workplace) address information to be verified. For example, the address to be verified can be a residential address of the user that is linked to an account, or the address of a work location of the user. From 402, method 400 proceeds to 404.

At 404, geographical location information of the user is received from the account within a predetermined time period. For example, the server can receive address information returned by the account. In some implementations, the geographical location information of the user can include geographical coordinates such as a latitude and a longitude. In some implementations, the geographical location information of the user can further include positioning accuracy, for example, indicating that the geographical location information of the user is accurate within a particular distance value. From 404, method 400 proceeds to 406.

At 406, a residential range of the user is determined in a geographical range obtained through pre-division. In some implementations the determination can be based on a trained classification model and the geographical location information of the user. As an example, the residential range of the user can be based on a life track (or normal daily habits) of the user, and compared against the relatively fixed and regular life tracks of people in general. For example, people typically work in an office or study at school in the daytime and rest at home at night. Similarly, on holidays, people typically travel for recreation in addition to resting at home. However, because the life track of people is relatively fixed and regular, a living area and a working area of the user can be accurately determined by determining location information of the user throughout different time periods.

In some implementations, determining the residential range of the user based on the trained classification model and geographical location information of the user reported by the account within a predetermined time period can include the use of positioning accuracy associated with geographic positioning. For example, geographical location information of the user based on a predetermined positioning accuracy threshold can be determined, the positioning accuracy not less than the predetermined positioning accuracy threshold from the geographical location information of the user reported by the account within the predetermined time period. Then, the residential range of the user can be determined in the geographical range obtained through pre-division. The determination can be based on the trained classification model and the geographical location information of the user, with the geographical location information's positioning accuracy not less than the predetermined positioning accuracy threshold. For reference, classifications of user location times are listed in Table 1.

In some implementations, classification models can be trained using training samples. For example, several accounts with real known (or previously-established) address information can be determined as training samples. A quantity of times that the training sample appears in each grid can be determined based on several pieces of geographical location information of the user reported by each training sample. A characteristic value corresponding to the training sample can be determined in each grid based on the quantity of times that the training sample appears in each grid. The classification model can be trained based on the characteristic value corresponding to the training sample in each grid and real known address information of the training sample.

In some implementations, training the classification model can be based on several accounts. For example, several accounts with real known living (home) address information and working (workplace) address information can be determined as training samples. Based on several pieces of geographical location information of the user reported by each training sample, a quantity of times and a moment that the training sample appears in each grid can be determined. A characteristic value corresponding to the training sample in each grid can be determined based on the quantity of times and the moment that the training sample appears in each grid. The classification model can be trained based on the characteristic value corresponding to the training sample in each grid, real known living (home) address information of the training sample, and real known working (workplace) address information of the training sample. In this way, the classification model can be used to determine the resident living range and the resident working range. In some implementations, at least one of an appearance frequency of the account and an appearance time period of the account can be determined using the characteristic value.

In some implementations, obtaining the geographical range through pre-division includes a division of a map into grids. For example, and as described with reference to FIG. 2, a map can be divided into several grids based on a predetermined grid size. Then, each grid on the map can be used as the geographical range obtained through pre-division.

In some implementations, the residential range of the user can be determined based on the trained classification model and geographical location information of the user received within the predetermined time period, including the characteristic values determined in each grid. For example, a characteristic value corresponding to the account in each grid can be determined based on the geographical location information of the user reported by the account within the predetermined time period. The characteristic value corresponding to the account in each grid can be input into the trained classification model to determine the residential range of the user.

In some implementations, the residential range of the user can be determined based on living and working ranges. For example, determining the residential range of the user based on the trained classification model and geographical location information of the user can include determining, in the geographical range obtained through pre-division, a resident living range and a resident working range of the account. The determination can be based on the trained classification model and the geographical location information of the user received by the account within the predetermined time period.

In some implementations, training the classification model can include the following. Several accounts with real known living (home) address information and working (workplace) address information can be determined as training samples. A quantity of times and a moment (or the amount of time) that the training sample appears in each grid can be determined based on several pieces of geographical location information of the user reported by each training sample. A characteristic value corresponding to the training sample in each grid can be determined based on the quantity of times and the moment (or the amount of time) that the training sample appears in each grid. The classification model can be trained based on the characteristic value corresponding to the training sample in each grid, real known living (home) address information of the training sample, and real known working (workplace) address information of the training sample. In this way, the classification model can be used to determine the residential living range and the residential working range. From 406, method 400 proceeds to 408.

At 408, the address information to be verified is matched with the residential range to generate a matching result. For example, the server can determine if the address is located in an area that includes the user's home address or work address. From 408, method 400 proceeds to 410.

At 410, a determination is made, based on the matching result and using information in the account associated with the user, whether the address information to be verified is false address information. For example, coordinates of the living (home) address information to be verified can be determined based on geographical coordinates, such as a longitude and a latitude, corresponding to the living (home) address information to be verified. A determination can be made whether the coordinates of the living (home) address information to be verified falls within the resident living range. In response to determining that the coordinates of the living address information to be verified fall within the resident living range, a determination can be made that the address information to be verified is not false address information. In response to determining that the coordinates of the living (home) address information to be verified does not fall within the residential living range, a determination can be made that the address information to be verified is false address information. In response to determining that the address information to be verified is the working (workplace) address information to be verified, coordinates of the working (workplace) address information to be verified can be determined based on a longitude and a latitude corresponding to the working (workplace) address information to be verified. A determination can be made whether the coordinates of the working (workplace) address information to be verified falls within the residential working range. In response to determining that the coordinates of the working address information to be verified falls within the residential working range, a determination can be made that the address information to be verified is not false address information. In response to determining that the coordinates of the working address information to be verified does not fall within the resident working range, a determination can be made that the address information to be verified is false address information.

In some implementations, determining whether the address information to be verified is false address information can include the use of coordinates associated with addresses. For example, coordinates of the address information to be verified can be determined based on a longitude and a latitude corresponding to the address information to be verified. A determination can be made whether the coordinates of the address information to be verified falls within the residential range. In response to determining that the coordinates of the address information to be verified falls within the residential range, a determination can be made that the address information to be verified is not false address information. In response to determining that the coordinates of the address information to be verified does not fall within the residential range, a determination can be made that the address information to be verified is false address information. After 410, method 400 can stop.

The present disclosure relates to identification of false address information. Address information submitted by a user for an account associated with the user is received. Geographical location information of the user is received within a predetermined time period. A residential range of the user is determined in a geographical range obtained through pre-division based on a trained classification model and the geographical location information of the user. The address information to be verified is matched with the residential range to generate a matching result. Based on the matching result and using information in the account associated with the user, a determination is made whether the address information to be verified is false address information. This process makes use of the residential range of the user that is determined by using a classification model and geographical location information of the user that is historically reported by the account. Because the geographical location information of the user reported by the account is real and corresponds to the account, the determined residential range is real and belongs to the account. This provides an advantage of increasing an accuracy of identifying false address information, an accuracy that is increased because of matching the address information to be verified with the residential range.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for identifying false address information, comprising:
    transmitting an address query to a user device;
    receiving, in response to transmitting the address query, address information to be verified for an account, wherein the address information is submitted by a user associated with the account;
    receiving geographical location information of the user within a predetermined time period;

determining, in a geographical range obtained through pre-division, a residential range of the user based on a trained classification model and the geographical location information of the user, wherein obtaining the geographical range through pre-division comprises:
  dividing a map into several grids based on a predetermined grid size; and
  using each grid on the map as the geographical range obtained through pre-division, and
  wherein the classification model is trained by using the following method:
    determining several accounts with real known address information as training samples;
    determining, based on several pieces of geographical location information reported by each training sample, a quantity of times that the training sample appears in each grid;
    determining a characteristic value corresponding to the training sample in each grid based on the quantity of times that the training sample appears in each grid; and
    training the classification model based on the characteristic value corresponding to the training sample in each grid and real known address information of the training sample;
  matching the address information with the residential range to generate a matching result; and
  determining, based on the matching result and using information in the account associated with the user, whether the address information is false address information.

2. The computer-implemented method of claim 1, wherein the geographical location information of the user comprises a latitude and a longitude.

3. The computer-implemented method of claim 2, wherein the geographical location information of the user further comprises positioning accuracy.

4. The computer-implemented method of claim 3, wherein determining, in the geographical range obtained through pre-division, the residential range of the user based on the trained classification model and geographical location information of the user received within a predetermined time period comprises:
  determining, based on a predetermined positioning accuracy threshold, geographical location information whose positioning accuracy is not less than the predetermined positioning accuracy threshold from the geographical location information of the user received within the predetermined time period; and
  determining, in the geographical range obtained through pre-division, the residential range of the user based on the trained classification model and the geographical location information whose positioning accuracy is not less than the predetermined positioning accuracy threshold.

5. The computer-implemented method of claim 1, wherein determining, based on the matching result, whether the address information is false address information comprises:
  determining coordinates of the address information based on a longitude and a latitude corresponding to the address information;
  determining whether the coordinates of the address information fall within the residential range;
  in response to determining that the coordinates of the address information fall within the residential range, determining that the address information is not false address information; and
  in response to determining that the coordinates of the address information do not fall within the residential range, determining that the address information is false address information.

6. The computer-implemented method of claim 1, wherein the geographical location information of the user comprises geographical location information of a mobile device of the user.

7. A non-transitory, computer-readable medium storing one or more instructions executable by a computer system to perform operations comprising:
  transmitting an address query to a user device;
  receiving, in response to transmitting the address query, address information to be verified for an account, wherein the address information is submitted by a user associated with the account;
  receiving geographical location information of the user within a predetermined time period;
  determining, in a geographical range obtained through pre-division, a residential range of the user based on a trained classification model and the geographical location information of the user, wherein obtaining the geographical range through pre-division comprises:
    dividing a map into several grids based on a predetermined grid size; and
    using each grid on the map as the geographical range obtained through pre-division, and
    wherein the classification model is trained by using the following method:
      determining several accounts with real known address information as training samples;
      determining, based on several pieces of geographical location information reported by each training sample, a quantity of times that the training sample appears in each grid;
      determining a characteristic value corresponding to the training sample in each grid based on the quantity of times that the training sample appears in each grid; and
      training the classification model based on the characteristic value corresponding to the training sample in each grid and real known address information of the training sample;
  matching the address information with the residential range to generate a matching result; and
  determining, based on the matching result and using information in the account associated with the user, whether the address information is false address information.

8. The non-transitory, computer-readable medium of claim 7, wherein the geographical location information of the user comprises a latitude and a longitude.

9. The non-transitory, computer-readable medium of claim 8, wherein the geographical location information of the user further comprises positioning accuracy.

10. The non-transitory, computer-readable medium of claim 9, wherein determining, in the geographical range obtained through pre-division, the residential range of the user based on the trained classification model and geographical location information of the user received within a predetermined time period comprises:
  determining, based on a predetermined positioning accuracy threshold, geographical location information whose positioning accuracy is not less than the predetermined positioning accuracy threshold from the geographical location information of the user received within the predetermined time period; and determining, in the geographical range obtained through pre-division, the residential range of the user based on the trained classification model and the geographical location information whose positioning accuracy is not less than the predetermined positioning accuracy threshold.

11. The non-transitory, computer-readable medium of claim 7, wherein determining, based on the matching result, whether the address information is false address information comprises:

determining coordinates of the address information based on a longitude and a latitude corresponding to the address information;

determining whether the coordinates of the address information fall within the residential range;

in response to determining that the coordinates of the address information fall within the residential range, determining that the address information is not false address information; and in response to determining that the coordinates of the address information do not fall within the residential range, determining that the address information is false address information.

12. The non-transitory, computer-readable medium of claim 7, wherein the geographical location information of the user comprises geographical location information of a mobile device of the user.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

transmitting an address query to a user device;

receiving, in response to transmitting the address query, address information to be verified for an account, wherein the address information is submitted by a user associated with the account;

receiving geographical location information of the user within a predetermined time period;

determining, in a geographical range obtained through pre-division, a residential range of the user based on a trained classification model and the geographical location information of the user, wherein obtaining the geographical range through pre-division comprises:

dividing a map into several grids based on a predetermined grid size; and using each grid on the map as the geographical range obtained through pre-division, and wherein the classification model is trained by using the following method:

determining several accounts with real known address information as training samples;

determining, based on several pieces of geographical location information reported by each training sample, a quantity of times that the training sample appears in each grid;

determining a characteristic value corresponding to the training sample in each grid based on the quantity of times that the training sample appears in each grid; and training the classification model based on the characteristic value corresponding to the training sample in each grid and real known address information of the training sample;

matching the address information with the residential range to generate a matching result; and determining, based on the matching result and using information in the account associated with the user, whether the address information is false address information.

14. The computer-implemented system of claim 13, wherein the geographical location information of the user comprises a latitude and a longitude.

15. The computer-implemented system of claim 14, wherein the geographical location information of the user further comprises positioning accuracy.

16. The computer-implemented system of claim 15, wherein determining, in the geographical range obtained through pre-division, the residential range of the user based on the trained classification model and geographical location information of the user received within a predetermined time period comprises:

determining, based on a predetermined positioning accuracy threshold, geographical location information whose positioning accuracy is not less than the predetermined positioning accuracy threshold from the geographical location information of the user received within the predetermined time period; and determining, in the geographical range obtained through pre-division, the residential range of the user based on the trained classification model and the geographical location information whose positioning accuracy is not less than the predetermined positioning accuracy threshold.

17. The computer-implemented system of claim 13, wherein determining, based on the matching result, whether the address information is false address information comprises:

determining coordinates of the address information based on a longitude and a latitude corresponding to the address information;

determining whether the coordinates of the address information fall within the residential range;

in response to determining that the coordinates of the address information fall within the residential range, determining that the address information is not false address information; and in response to determining that the coordinates of the address information do not fall within the residential range, determining that the address information is false address information.

18. The computer-implemented system of claim 13, wherein the geographical location information of the user comprises geographical location information of a mobile device of the user.

* * * * *